US012050667B2

(12) United States Patent
Drake et al.

(10) Patent No.: US 12,050,667 B2
(45) Date of Patent: *Jul. 30, 2024

(54) CRYPTOGRAPHICALLY MANAGING LICENSE COMPATIBILITY

(71) Applicant: T-Mobile USA, Inc., Bellevue, WA (US)

(72) Inventors: Aaron Drake, Sammamish, WA (US); Lee Miller London, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,287

(22) Filed: May 4, 2023

(65) Prior Publication Data

US 2023/0273979 A1 Aug. 31, 2023

Related U.S. Application Data

(63) Continuation of application No. 16/557,640, filed on Aug. 30, 2019, now Pat. No. 11,651,056.

(51) Int. Cl.
*G06F 21/10* (2013.01)
*G06F 21/12* (2013.01)
(Continued)

(52) U.S. Cl.
CPC .......... *G06F 21/105* (2013.01); *G06F 21/125* (2013.01); *H04L 9/3236* (2013.01); *H04L 9/3247* (2013.01)

(58) Field of Classification Search
CPC ...... G06F 21/105; G06F 21/125; G06F 21/16; G06F 21/64; H04L 9/3236; H04L 9/3247; H04L 9/3239; H04L 9/50
(Continued)

(56) References Cited

U.S. PATENT DOCUMENTS 9,720,925 B1 * 8/2017 Lawson ................ G06F 40/194
10,339,299 B1 * 7/2019 Magnuson ............. G06F 21/52
(Continued)

OTHER PUBLICATIONS

Luo et al. ("Ariadne: An Eclipse-based system for tracking the originality of source code", IBM Systems Journal, vol. 46, No. 2, 2007 ) (Year: 2007).*

(Continued)

*Primary Examiner* — James D Nigh

(57) ABSTRACT

This disclosure describes techniques for implementing a blockchain to manage license compatibility. The techniques include parsing a code segment in a version of source code based on one or more parsing parameters, wherein the code segment is associated with a transaction and distributed under a license. Thereafter, one or more blocks are inserted onto a blockchain distributed ledger recording the transaction. Upon receiving an updated version of the source code comprising a change to at least one code segment associated with a new transaction, additional blocks are inserted onto the ledger recording the new transaction. Based at least on the transaction recorded in the blocks, the license associated with the version of the source code is identified. Additionally, a flag may indicate license incompatibility with the license if the change to at least one code segment associated with the new transaction violates a license restriction of the identified license.

20 Claims, 7 Drawing Sheets

(51) Int. Cl.
*H04L 9/32* (2006.01)
*G06F 21/16* (2013.01)
*G06F 21/64* (2013.01)
*H04L 9/00* (2022.01)

(58) Field of Classification Search
USPC .......................................................... 705/59
See application file for complete search history.

(56) References Cited

U.S. PATENT DOCUMENTS

| | | | |
|---|---|---|---|
| 2006/0116966 A1* | 6/2006 | Pedersen | G06F 21/10 |
| | | | 705/59 |
| 2016/0202972 A1* | 7/2016 | Sass | G06F 8/75 |
| | | | 717/121 |
| 2017/0046698 A1 | 2/2017 | Haldenby et al. | |
| 2018/0191503 A1 | 7/2018 | Alwar et al. | |
| 2018/0285970 A1 | 10/2018 | Snow et al. | |
| 2018/0329693 A1* | 11/2018 | Eksten | G06F 8/65 |
| 2019/0065709 A1* | 2/2019 | Salomon | H04L 9/0643 |
| 2020/0186361 A1 | 6/2020 | Almgren et al. | |
| 2020/0287874 A1* | 9/2020 | Bertram | G06Q 30/018 |

OTHER PUBLICATIONS

"How do I properly credit an original code's developer for her open source contribution?", downloaded from https://www.quora.com/How-do-I-properly-credit-an-original-codes-developer-for-her-open-source-contribution dated Aug. 29, 2014 and attached as PDF file. (Year: 2014).
U.S. Appl. No. 16/557,542, Final Office Action mailed Dec. 17, 2021, 31 pages.
U.S. Appl. No. 16/557,542, Notice of Allowance mailed Nov. 1, 2022, 47 pages.
U.S. Appl. No. 16/557,542, Office Action mailed Jun. 2, 2022, 45 pages.
U.S. Appl. No. 16/557,542, Office Action mailed Jun. 24, 2021, 22 pages.
U.S. Appl. No. 16/557,640, Final Office Action mailed Jul. 1, 2022, 57 pages.
U.S. Appl. No. 16/557,640, Notice of Allowance mailed Jan. 11, 2023, 49 pages.
U.S. Appl. No. 16/557,640, Notice Allowance mailed Oct. 20, 2022, 35 pages.
U.S. Appl. No. 16/557,640, Office Action mailed Dec. 17, 2021, 54 pages.

* cited by examiner

CRYPTOGRAPHICALLY MANAGING LICENSE COMPATIBILITY

CROSS-REFERENCE TO RELATED APPLICATION

This application is a continuation of U.S. application Ser. No. 16/557,640, filed Aug. 30, 2019, which is incorporated by reference.

BACKGROUND

A combined work includes multiple differently-licensed parts. License compatibility allows for pieces of software with different software licenses to be distributed together. The need for such a framework arises because the different licenses can contain contradictory requirements, rendering it impossible to legally combine source code from separately-licensed software in order to create and publish a new program. To achieve a combined work including copyleft licensed components proper isolation or separation needs to be maintained. With individually licensed source code, multiple non-reciprocal licenses (such as permissive licenses or own proprietary code) can be separated, while the combined compiled program could be re-licensed.

Particularly, licenses common to free and open-source software (FOSS) are not necessarily compatible with each other, and this can make it legally impossible to mix or link open-source code if the components have different licenses. For example, software that combined code released under version 1.1 of the Mozilla Public License (MPL) with code under GNU General Public License (GPL) could not be distributed without violating the terms of the licenses. In another example, a copyleft license (e.g., GPL) often has only one-way compatibility, making the copyleft license incompatible with proprietary commercial licenses and many non-proprietary licenses.

Thus, some projects result in incompatible licenses, and the only feasible way to resolve this is to re-license the incompatible parts. Re-licensing is achieved by contacting all involved developers and other parties and getting their agreement for the changed license. However, in the free and open source domain, achieving unanimous consent is often impossible because it is difficult to track and manage many of the contributors involved.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
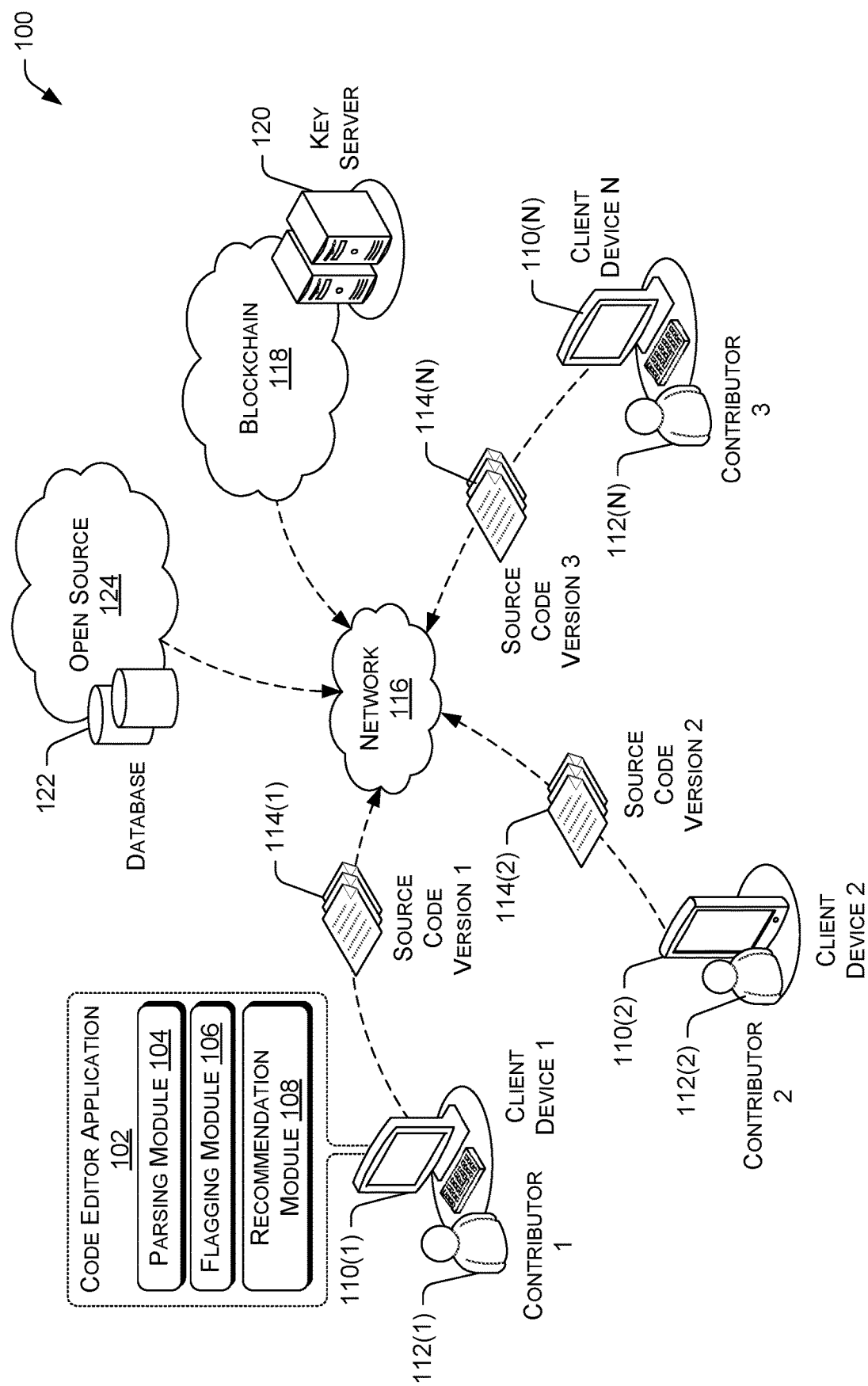
FIG. 1 illustrates example system architecture for tracking multiple versions of combined work using open source created from multiple client devices.

This disclosure is directed to techniques for implementing blockchain for managing license compatibility. In various embodiments, one or more client devices can be employed as peer computing nodes that each store a copy of a blockchain distributed ledger. The individual client devices comprise a code editor application. In some aspects, a contributor can create and edit source code using the code editor application, which allows for viewing and writing source code in various programming languages (e.g., Java®, C, C#, C++, etc.), or any scripting language (e.g., Ruby, PHP, Perl, Python, TCL), as well as any combinations thereof. The blockchain distributed ledger maintains a public record of series of transactions made by one or more contributors of the source code and subsequent recipients of the source code.

In various embodiments, public key cryptography can be applied, whereby public key cryptography signing algorithms can provide key distribution and secrecy (e.g., Diffie-Hellman key exchange, asymmetric key encryption scheme), provide digital signatures (e.g., Digital Signature Algorithm (DSA)), or both (e.g., Rivest-Shamir-Adleman (RSA) algorithm). A private key can be generated locally on a contributor's client device such that it is private to that contributor. A public key can be derived from the private key and therefore correspond to the private key. The public key can be tied to a contributor's subject identifier (e.g., an email address) in a security certificate issued by a certificate authority. As long as the private key is kept a secret, any signature produced using the private key serves as proof that the signer is the same party that originally published the public key. In addition to Public Key Infrastructure (PKI), Authentication and Key Agreement (AKA) scheme, and/or other authentication protocol such as multi-factor authentication and Shared Access Signature (SAS) certification can be implemented, depending upon embodiments.

Public keys can be recorded in a public ledger of ownership rights. Digital assets can be associated with these public keys such that the public keys serve as the digital representation of the owner of the assets. A transfer of ownership of a digital asset from one public key to another can be signed with the corresponding secret private key of the sender to prove the authenticity and the integrity of the message. Thus, any record keeping entity tasked with recording changes and transfers to the ledger would have no way to forge such transfer if it was not initiated and signed by the sender. In this way, the signature also ensures that no data in the message is manipulated. The source code is signed with the contributor's private key and such transaction is referenced in a blockchain to verify the ownership and the authenticity of the source code. The digital signature software may integrate with cloud storage services to allow the contributor to save and access the source code in any of the contributor's cloud storage accounts.

Signed transactions can be grouped into blocks that can be propagated to the whole network before subsequent blocks of transactions are produced. Each block references and builds off a previous block using cryptographic hash functions (e.g., Message Digest (MD)-5, Secure Hash Algorithms (SHA)-1, SHA-2, or SHA-256) of a private key held by a contributor. Further, a public key, which may be distributed to one or more parties of the distributed ledger, may be used to authenticate that the holder of the private key used in the hash function is indeed the same contributor, therefore verifying the identity of the contributor in the system. A hash function takes arbitrary digital data as input and returns a digest, a hash value, or a fixed length pseudo-random number as output. This hash function value generally falls within a very restrictive range set by a predefined protocol. Tying each block to its previous block with these hash functions in a consecutive order generates a chain, thereby creating the blockchain (i.e., the ledger), containing all accepted transactions.

A public ledger representing the state of ownership of source code can be deduced from the full record of transactions in the blockchain beginning with the first block. Because each block contains a cryptographic hash of the immediately previous block or a reference that links it to the immediately previous block, the transaction cannot be reversed. If any data is changed or missing, the calculated hash values would also change for all blocks from that point forward. The changed hash values would no longer fall within the range required by the predefined protocol, and the chain would be invalid. In this way, source code cannot be manipulated or altered without affecting the blockchain. Various cryptographic time-stamping methods are available and could also be used. The contributor's private key can authenticate the source code to the extent that the private key is not compromised or known to anyone else but the contributor.

In some aspects, the code editor application comprises a parsing engine that can isolate at least one code segment of a source code based at least on one or more parsing parameters to properly separate differently-licensed parts in a combined work. For example, upon creation of new source code, the parsing engine can read lines from the source code and extract information, patterns, from each line to parse the source code into one or more code segments. Segments can comprise a module, a function, a method, a library, and/or so forth, depending upon embodiments. A code segment of the source code can be associated with a single contributor, and the contributor's private key algorithm is applied to the digest or the hashed value of the code segment of the source code. If the source code has multiple contributors in a collaborative scenario, a first code segment can be associated with a first contributor, and the first contributor's private key algorithm is applied to the hashed value of the first code segment. Similarly, a second code segment of the same source code can be associated with a second contributor, and the second contributor's private key algorithm is applied to the hash value of the second code segment. The individual transactions associated with respective code segments of the source code can correspond to a block in a blockchain, and as the source code is modified by one or more contributors, the chain becomes longer.

A code segment or a source code can be distributed under a license that imposes restrictions. In some aspects, a hash value of the code segment associated with a transaction in a block of a blockchain distributed ledger can be compared against a related database entry in a database of known hash values of code segments or source code associated with licenses or license restrictions. In this way, different licenses and individually licensed parts in a combined work can be identified to determine whether the licenses under which the combined work is distributed are compatible. Identifying incompatible licenses can trigger a flag notification to a contributor to resolve the incompatibility. For example, the contributor may request re-licensing from one or more contributors involved or purchase a license to utilize the code.

In some aspects, the code editor application may interface with a platform for providing hosting and software development services. The platform may host open source software. The platform also may provide distributed version control and source code management functionality as well as access control and collaboration features such as bug tracking, feature requests, task management, performing searches in data repositories or codebase, and/or so forth. The techniques described herein may be implemented in a number of ways. Example implementations are provided below with reference to the following figures.

Example Architecture

FIG. 1 illustrates example architecture for tracking multiple versions of combined work using open source created from multiple client devices, in accordance with some embodiments. The architecture 100 includes a system that implements a distributed ledger such as a blockchain 118 or any other data storage structure. Blockchains are secure by design and exemplify a distributed computing system with high Byzantine fault tolerance. The blockchain 118 may include a plurality of blocks. Each block is identified with a cryptographic hash of its content, wherein the content can comprise a plurality of transactions related to the source code 114(1)-114(N). Except for the first block, each block contains a reference to the previous block in the chain. The reference is the cryptographic hash of the content of the previous block. In various embodiments, the plurality of transactions can be ordered chronologically, such that each newly added block may be linked to a most recent block.

The blockchain 118 is shared among multiple computing nodes such as client devices 110(1)-110(N) or servers in communication with a network 116 (e.g., a cellular network or a geographically disparate Wi-Fi network) and is used to record and check transactions in a cryptographically secure manner. The client devices 110(1)-110(N) can comprise general-purpose computers such as desktop computers or laptop computers, as well as various mobile devices that can include smartphones, personal digital assistants (PDAs), tablet computers, and/or other electronic devices executing conventional web browser applications, or applications that have been developed for a specific platform (e.g., operating system, computer system, or some combination thereof) and that are capable of receiving input, processing the input, and generating output data.

The structure of the blocks may be tamper-resistant. For instance, a block may be added to the blockchain 118 only if all of the computing nodes (i.e., client devices 110(1)-110(N)) or a subset of nodes with sufficient computation power in the network 116 implementing the blockchain 118 agree on the block. In addition, each block has a cryptographic proof-of-work embedded in it, such that past transactions cannot be altered without breaking a chain of cryptographic proofs. Because each block in the blockchain represents a transaction or a set of transactions, more proof-of-work is needed for longer chains.

Each time a transaction is recorded to the blockchain, the transaction is organized into a transaction block for addition to the blockchain. In various embodiments, several transactions are received and are organized into a single transaction block based on predefined criteria (e.g., a timeframe in which the transactions are received). It is noted that there may be multiple chains that can be traced back to a first block in the blockchain 118, depending upon embodiments. For example, the first block can refer to transactions related to at least a code segment of source code or a document. Subsequently, the source code can be duplicated to make the first set of changes to the first copy of the source code and the second set of changes to the second copy of the source code. Changes may be made to the same code segment of the source code, an additional code segment of the source code, or a new code segment of the source code. The individual code segments of the first copy of the text source code and the second copy of the source code can be signed. Thereafter, the signed transaction for the first copy of the source code can be referenced in a first blockchain, and the signed transaction for the second copy of the source code can be referenced in a second blockchain. Both the first blockchain and the second blockchain can be traced back to the first block.

The architecture 100 may further include a code editor application 102. The code editor application 102 may comprise a kit of viewers and editors for source code in various programming languages. The code editor application 102 can be a native software program that resides locally in part or in whole on the one or more client devices 110(1)-110(N). Additionally, or alternatively, the code editor application 102 can be a cloud-based application or a web-based application that relies on one or more remote computing nodes such as servers. In this way, the client devices 110(1)-110(N) can execute the code editor application 102 to log onto the one or more computing nodes and create source code in various programming languages, which may be stored and maintained locally on the client devices 110(1)-110(N) and/or a remote database.

The code editor application 102 is configured to edit source code and provide features typical of an HTML, CSS, JavaScript, PHP editor, and/or so forth. For example, the code editor application 102 may provide syntax highlighting, find and replace, cut, copy, and paste, undo/redo, data transformation, language modes, auto-completion, code folding, bracket and tag matching, split views, inline and block widgets, bi-directional text support, extensibility, and/or so forth. These features may be switched on and off by a user command received via an application contributor interface, which may comprise a graphical contributor interface (GUI) that can include a dashboard and/or formatting tools for display. The code editor application 102 support plain text, XML files, NSIS files, batch files, C# files, Java files, and/or so forth.

The code editor application 102 comprises a parsing module 104 for parsing source code into one or more code segments based at least on one or more parsing parameters such as contributors involved, programming language, operating system, and/or so forth. The client devices 110(1)-110(N) may have access to a database where parsing parameters can be stored. In various embodiments, the parsing module 104 may implement a machine learning algorithm to identify and parse one or more code segments of source code.

Additionally, the code editor application 102 may further comprise a component that supports digital signing, signature verification, and/or encryption. The keys utilized for digital signing may be provided by a key server 120. In various embodiments, the distributed ledger may include both public and private data streams or channels. Private channels may be accessible only to member computing nodes that possess appropriate cryptographic keys. Thus, the key server 120 may generate cryptographic keys for one or more client devices 110(1)-110(N) that enable those client devices to view and add private blocks to the distributed ledger. The key server 120 may include general-purpose computers, such as desktop computers, tablet computers, laptop computers, servers, or other electronic devices that are capable of receiving input, processing the input, and generating output data. The key server 120 may also be virtual computing devices in the form of computing nodes, such as virtual machines and software containers.

In the illustrated embodiment, the first contributor 112(1) at the first client device 106(1) may create a first version of the source code 114(1). At least a code segment of the first version of the source code 114(1) may be distributed under a license (e.g., a free open source software license). A hash algorithm is applied to at least a code segment of the first version of the source code 114(1) to create a unique hash value associated with the code segment, and therefore the license under which the first version of the source code 114(1) is distributed. Additionally, the first contributor 112(1) may cryptographically sign the code segment in the first version of the source code 114(1) with the first contributor's private key and transmit the first version of the source code 114(1) to a second contributor 112(2) or uploaded to an open source platform 124. The open source platform 124 can provide hosting and software development services. Additionally, the platform may provide distributed version control and source code management functionality via a marketplace as well as access control and collaboration features.

The signatures associated with respective contributors can be stored separately (e.g., in a database) from the source code, depending upon embodiments. The first version of the source code 114(1) may or may not be encrypted, depending upon embodiments. For instance, an encryption component of the code editor application 102 may apply a cryptographic algorithm (e.g., Advanced Encryption Standard (AES)) to at least a code segment of the source code 114(1) to at least partially obfuscate the source code 114(1).

The first contributor's signature can be used to authenticate the code segment of the first version of the source code 114(1) and the identity of the first contributor 112(1), which can be used to transmit a request for re-licensing a segment of the source code, depending upon embodiments. In some aspects, upon receiving the first version of the source code 114(1), the second contributor 112(2) at the second client device 110(2) can verify the first contributor's signature by using the first contributor's public key to decrypt the first contributor's signature and to create a first hash value and compare the first hash value to the unique hash value calculated using the hash algorithm. If the first hash value matches the unique hash value, the first contributor's signature is verified. If the second contributor 112(2) is unable to decrypt the signature using the first contributor's public key, the second client device 110(2) can indicate that the signature is invalid.

Additionally, or alternatively, the second contributor 112(2) can verify whether the code segment of the first version of the source code 114(1) is authentic by processing the code segment of the first version of the source code 114(1) through the same hash algorithm to create a second hash value. If the second hash value matches the unique hash value, the code segment of the first version of the source code 114(1) is authentic. Further, the first hash value and the second hash value may be compared. If the first hash value matches the second hash value, the second contributor 112(2) at the second client device 110(2) can confirm that the code segment of the first version of the source code 114(1) has not changed in transit and that the first contributor 112(1) is the contributor of the code segment of the first version of the source code 114(1).

In various embodiments, two or more contributors (e.g., the first contributor 112(1) and the second contributor 112(2)) may have concurrent access to the same source code. In this scenario, each contributor can sign a code segment of the source code that he or she authors with his or her respective private key. Additionally, or alternatively, the second contributor 112(2) at the second client device 110(2) may create a second version of the source code 114(2). The second version of the source code 114(2) can include a change to the code segment (i.e., an updated code segment) and/or a new (i.e., additional) code segment. Thus, the second version of the source code 114(2) can comprise a combined work and the updated code segment and/or the new code segment is isolated or separated. A hash algorithm is applied to the updated code segment and/or the new code segment of the second version of the source code 114(2) to create a second unique hash value associated with the updated and/or the new code segment of the second version of the source code 114(2). The hash algorithm applied to the updated code segment and/or the new code segment may be the same or different from the hash function applied to the code segment of the first version of the source code 114(1). Additionally, the second contributor 112(2) may cryptographically sign the code segment in the second version of the source code 114(2) with the second contributor's private key and transmit the second version of the source code 114(2) to a subsequent contributor 112(N). The second version of the source code 114(2) may or may not be encrypted, depending upon embodiments.

The subsequent contributor 112(N) at the subsequent client device 110(N) can verify the second contributor's signature by using the second contributor's public key to decrypt the second contributor's signature and to create a third hash value and compare the third hash value to the second unique hash value. If the third hash value matches the second unique hash value, the second contributor's signature is verified. If the subsequent contributor 112(N) is unable to decrypt the signature using the second contributor's public key, the subsequent client device 110(N) can indicate that the signature is invalid.

The subsequent contributor 112(N) can also verify whether the updated code segment and/or the new (i.e., additional) code segment of the second version of the source code 114(2) is authentic by processing the code segment of the second version of the source code 114(2) through the same hash algorithm to create a fourth hash value based on the plaintext represented in the updated code segment. If the fourth hash value matches the second unique hash value, the code segment of the second version of the source code 114(2) is authentic. Further, the third hash value and the fourth hash value may be compared. If the third hash value matches the fourth hash value, the subsequent contributor 112(N) at the subsequent client device 110(N) can confirm that the code segment of the second version of the source code 114(2) has not changed in transit and that the second contributor 112(2) is the contributor of the updated code segment of the second version of the source code 114(2). In various embodiments, the source code can be authenticated by way of any of the techniques now available in the art or which may become available (e.g., Twofish, RSA algorithm, El Gamal, Schorr signature, DSA, Pretty Good Privacy (PGP), GNU Privacy Guard (GPG or GnuPG), or other symmetric and asymmetric cryptography systems).

The signed transactions are recorded in the blockchain 118. In the illustrated embodiment, a first block can refer to a transaction related to the first version of the source code 114(1) created and signed by the first contributor 112(1) at the first client device 106(1). Subsequently, the second contributor 112(2) can make changes to the first version of the source code 114(1) to create and sign the second version of the source code 114(2) at the second client device 110(2). The signed transaction associated with the second version of the source code 114(2) can be referenced in a second block. This process continues with additional contributors 112(N) to create additional versions of the source code 114(N) at additional client devices 110(N).

In some aspects, a hash value associated with a code segment can be compared, via a flagging module 106 of the code editor application 102, against a related database entry in a database 122 of known hash values of code segments or source code associated with licenses and license restrictions or license terms of various licenses (e.g., permissive, copyleft, etc.) in order to identify a license and license restrictions that are associated with a code segment of a transaction recorded in one or more blocks. For example, restrictions or terms may determine how a code segment or a modified version of the source code may be copied, modified, redistributed, or made available to others. Upon identifying licenses that are associated with individual code segments of transactions recorded in one or more blocks, the flagging module 106 can determine whether the licenses are compatible. Additionally, or alternatively, the flagging module 106 can determine whether a code segment violates a license restriction of an identified license. In response to determining license incompatibility or violation of a license restriction, the flagging module 106 may flag a code segment to indicate an error. In some aspects, the flagging module 106 may interface with a server-side source code management platform for when a contributor checks in code that is associated with licenses and license restrictions or license terms of various licenses. For example, the flagging module 105 may provide notifications to a contributor when the contributor's code is used to share and/or build software. The server-side source code management platform may be configured to track usage of the contributor's code to enable the contributor to adjust restrictions associated with the code based on its usage statistics and/or other information.

In the illustrated embodiment, the code editor application 102 comprises a recommendation module 108 for generating a recommendation to resolve the license incompatibility. For example, a recommendation module 108 may recommend re-licensing or purchasing a license. The re-licensing or the purchasing of a license may be facilitated via the open source platform 124 or a marketplace platform that may interface with the code editor application 102. In some aspects, the recommendation module 108 may generate a recommendation based at least on the error. Additionally, or alternatively, the recommendation module 108 may generate a recommendation based on a predetermined protocol, which may be stored in a database. The database may include table-based servers, document-based servers, unstructured servers, relational servers, non-relational servers, or any combinations thereof.

Figure 2:
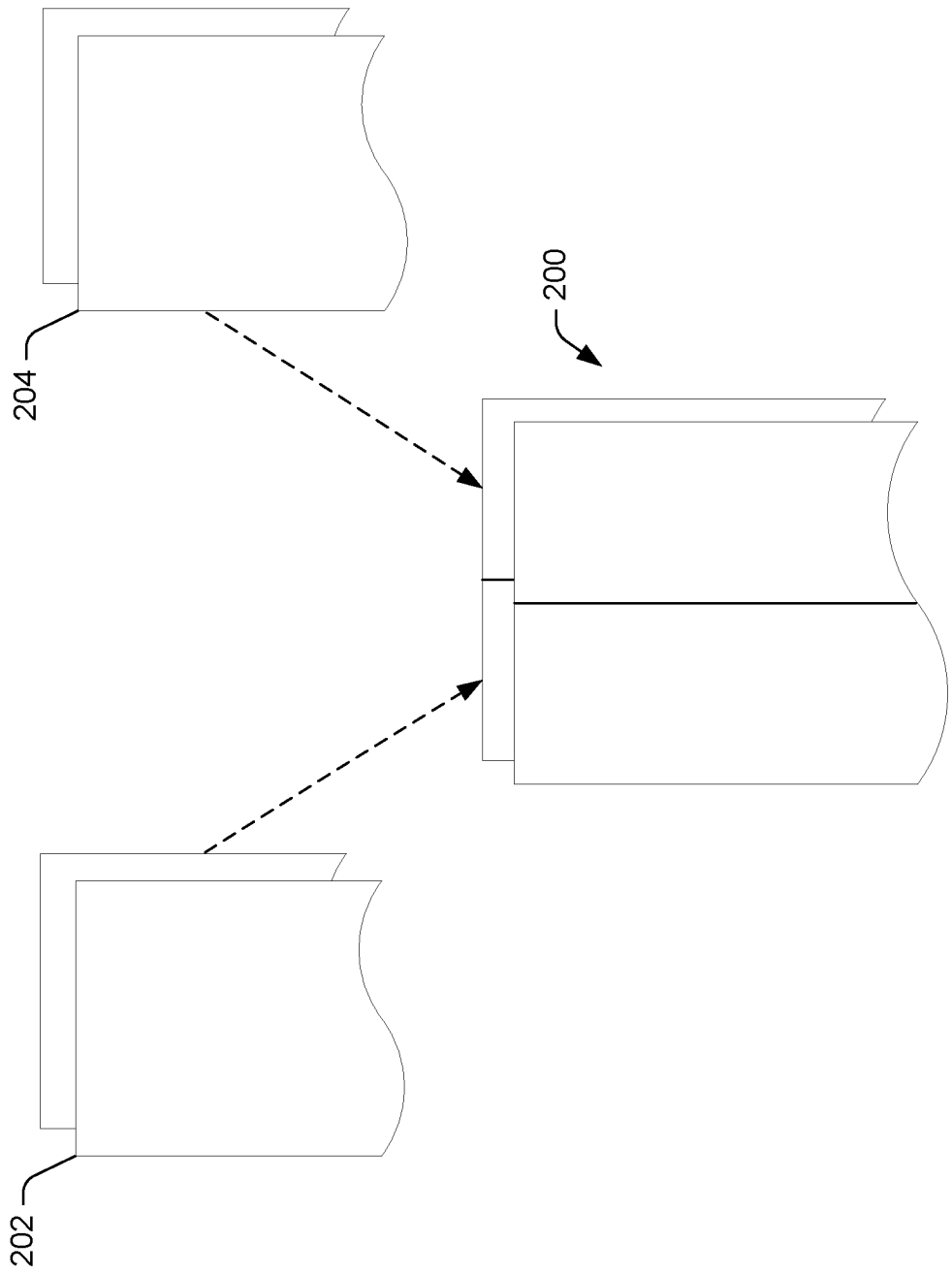
FIG. 2 illustrates an embodiment of combined work from a contributor's own software component and open source components.

FIG. 2 illustrates an embodiment of a combined work 200 comprising source code that may be created or edited using the code editor application. In the illustrated embodiment, the combined work 200 may be generated using at least one code segment of a first source code 202 and at least one code segment of a second source code 204. The first source code 202 and/or the second source code 204 may comprise opens source. Thus, the first source code 202 and the second source code 204 may be distributed under the same or different licenses.

In the illustrated embodiment, the code segment of the first source code 202 and the code segment of the second source code 204 in the combined work 200 are parsed via a parsing module of the code editor application. If the first source code 202 comprises a contributor's own software component, a hash algorithm may be applied to the individual code segments of the first source code 202 to create a unique hash value associated with the individual code segments. The contributor may then cryptographically sign the source code with his or her private key and the transaction is recorded on the blockchain. The hash algorithm may also be applied to the individual code segments of the second source code 204. The hash values may be used to identify the license associated with the first source code 202 and the second source code 204 and determine whether the license under which the first source code 202 is distributed conflicts with the license under which the second source code 204 is distributed. If a determination is made that the license under which the first source code 202 is distributed is incompatible with the license under which the second source code 204 is distributed, at least a segment of the first source code 202 and/or the second source code 204 may be flagged.

Figure 3:
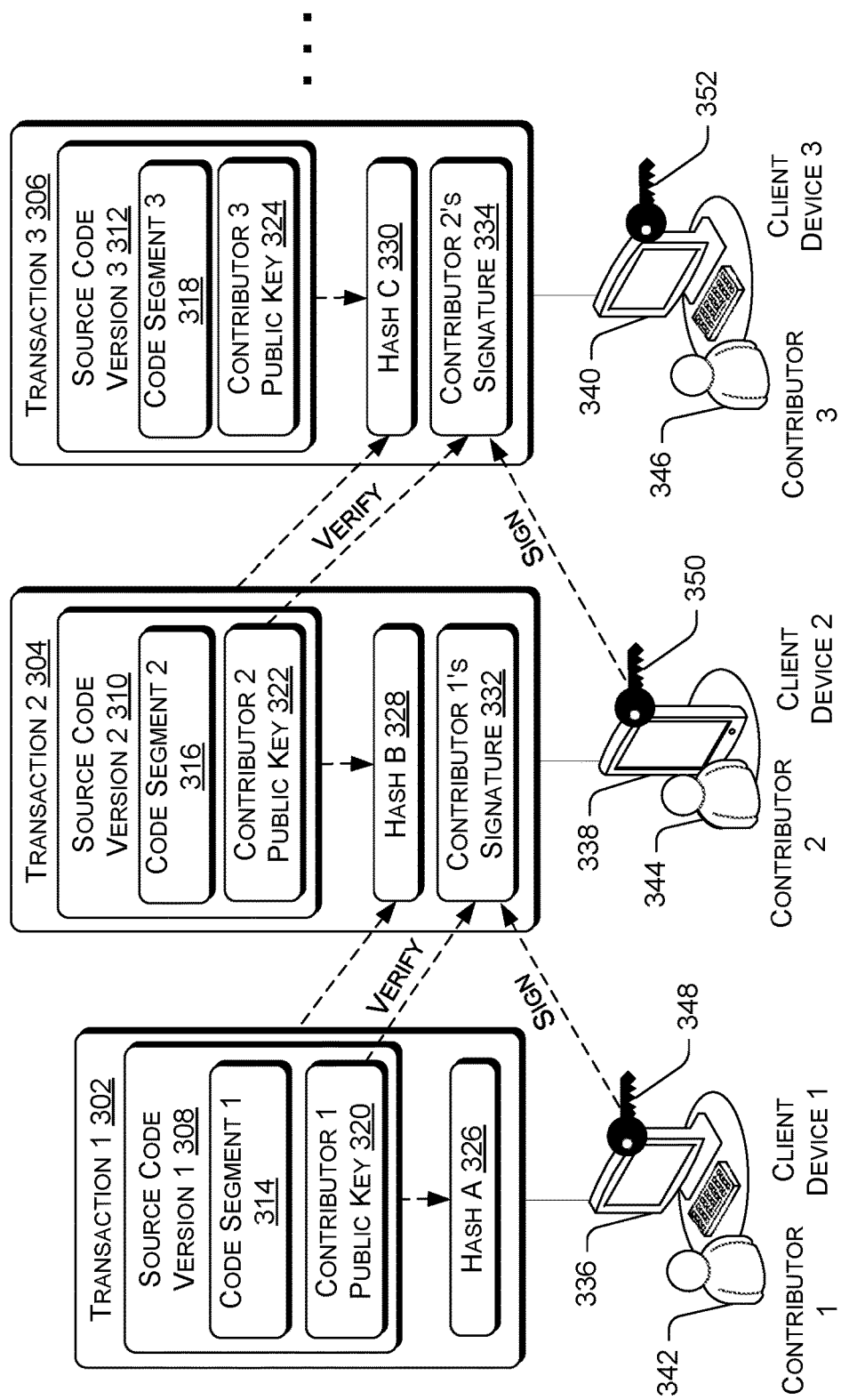
FIG. 3 is a block diagram of an example system architecture for implementing blockchain for managing license compatibility.

FIG. 3 is a block diagram of an example system architecture for implementing a blockchain for verifying and tracking licenses associated with individually parsed code segments of source code. The first contributor 342 at the first client device 336 creates the first version of a source code 308 using a code editor application. The first contributor 342 may author a first code segment 314 in the first version of the source code 308. A hash algorithm is applied to the first code segment 314 and a hash value 326 associated with the first code segment 314 is generated. The hash value 326 is signed with the first contributor's private key 348 using digital signature software to certify the source code and transmit it to the second contributor 344 at the second client device 338. This first transaction 302 is recorded onto a blockchain distributed ledger.

Subsequently, the second client device 338 may receive, from the first client device 336 or from an open source platform, the first version of the source code 308. The first contributor's public key 320 is used to decrypt the first contributor's signature 332 and the resulting hash is compared with the hash value 326 to determine whether the first contributor's signature 332 is valid. Additionally, the second client device 338 may process the first code segment 314 through the same hash algorithm to determine whether the resulting hash is identical to the hash value 326. The resulting hash values are also compared to determine whether the first code segment 314 of the first version of the source code 308 has not been changed and that the first contributor 342 is the contributor of the first code segment 314 of the first version of the source code 308.

Upon authenticating the first code segment 314 of the first version of the source code 308 and verifying the first contributor's signature 332, the second client device 338 may create a second version of the source code 310. The second version of the source code 310 can comprise a combined work. In the illustrated embodiment, the second version of the source code 310 may include a second code segment 316, wherein the second contributor 344 may contribute the second code segment 316 in the second version of the source code 310 and electronically sign the source code using the second contributor's private key 350 to certify the source code and transmit it to the third contributor 246 at the third client device 340. This second transaction 304 is recorded onto the blockchain distributed ledger.

The third client device 340 may receive, from the second client device 338, the second version of the source code 310. The second contributor's public key 322 is used to decrypt the second contributor's signature 334 and the resulting hash is compared with the hash value 328 to determine whether the second contributor's signature 334 is valid. Additionally, the third client device 340 may process the second code segment 316 through the same hash algorithm to determine whether the resulting hash is identical to the hash value 328. The resulting hash values are also compared to determine whether the second code segment 316 of the second version of the source code 310 has not been changed and that the second contributor 344 is the contributor of the second code segment 316 of the second version of the source code 310.

Upon authenticating the second code segment 316 of the second version of the source code 310 and verifying the second contributor's signature 334, the third client device 340 may create a third version of the source code 312, which may also comprise a combined work. In the illustrated embodiment, the third version of the source code 312 may include a third code segment 318 that is hashed and electronically signed by the third contributor 346 using the third contributor's private key 352 to certify the third version of the source code 312. This third transaction 306 is recorded onto the blockchain distributed ledger. Thereafter, subsequent contributors can utilize the third contributor's public key 324 to verify the third contributor's signature. Additionally, the third code segment 318 can be processed through the same hash algorithm to generate a hash value that is compared to the hash value 330 associated with the third transaction 306.

In some aspects, the hash values may be used to identify one or more licenses that are associated with source code in a transaction. For instance, the first code segment 314 of the first version of the source code 308 and the second code segment 316 of the second version of the source code 310 can be hashed at the third client device 340 using the same hash algorithm. If the resulting hash values are the same, then the third client device 340 can determine that the first codes segment 314 and the second code segment 316 are distributed under a common license. Additionally, the hash values may be compared against a related database entry in a database of known hash values of code segments associated with licenses and/or license restrictions to identify the license that is associated with the respective source code.

Example Computing Device Components

Figure 4:
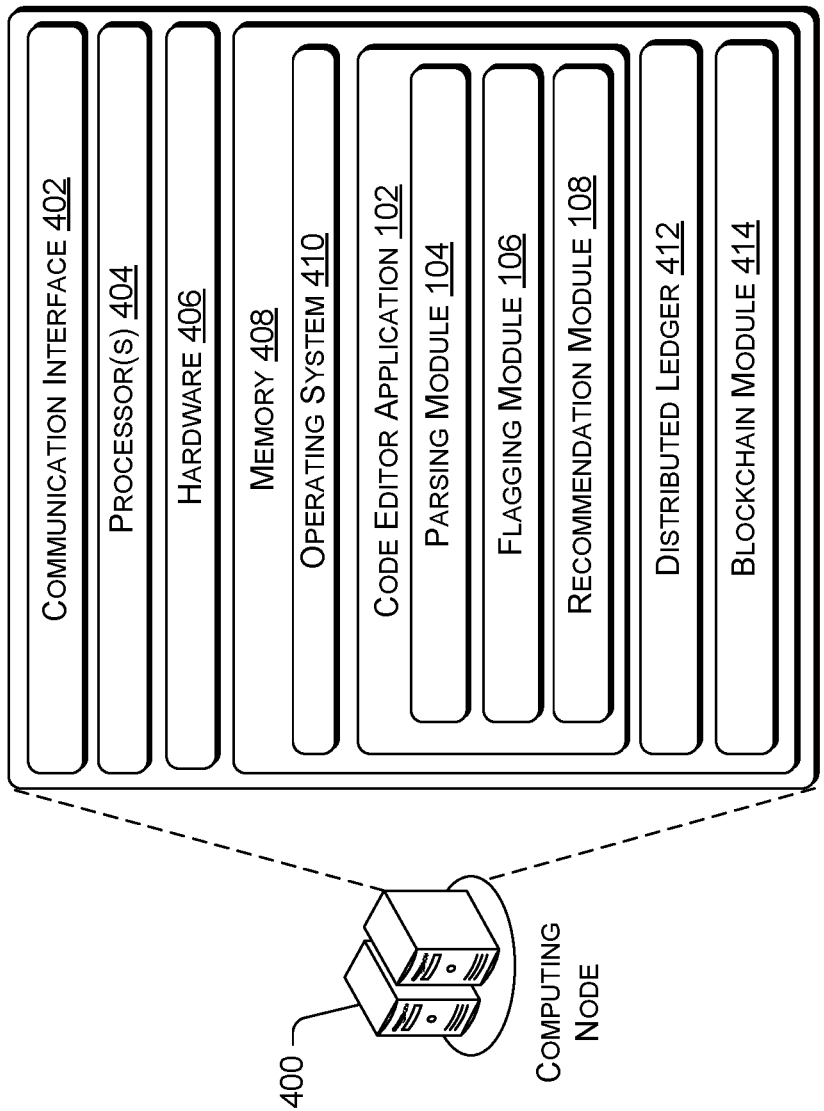
FIG. 4 is a block diagram showing various components of one or more computing devices that are configured to manage license compatibility when generating combined work.

FIG. 4 is a block diagram showing various components of one or more illustrative computing devices comprising one or more computing nodes 400 that can comprise a plurality of peer computer systems that each store at least a portion of a blockchain distributed ledger. It is noted that the computing device(s) as described herein can operate with more or fewer of the components shown herein. Additionally, the computing device(s) as shown herein or code segments thereof can serve as a representation of one or more of the computing devices of the present system.

The one or more computing nodes 400 may include a communication interface 402, one or more processors 404, hardware 406, and a memory unit 408. The communication interface 402 may include wireless and/or wired communication components that enable the one or more computing nodes 400 to transmit data to and receive data from other networked devices. In at least one example, the one or more processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then execute these instructions by calling on the ALUs, as necessary, during program execution. The one or more processor(s) 404 may also be responsible for executing all computer applications stored in the memory, which can be associated with common types of volatile (RAM) and/or non-volatile (ROM) memory. The hardware 406 may include additional hardware interfaces, data communication, or data storage hardware. For example, the hardware interfaces may include a data output device (e.g., visual display, audio speakers), and one or more data input devices (e.g., keypads, keyboards, mouse devices, touch screens that accept gestures, microphones, voice or speech recognition devices, etc.).

The memory unit 408 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism. In contrast, communication media may embody computer-readable instructions, data structures, program modules, or other data in a modulated data signal, such as a carrier wave, or other transmission mechanisms. The memory 408 may also include a firewall. In some embodiments, the firewall may be implemented as hardware 406 in the computing node 400.

The processor 404 and the memory unit 408 may implement an operating system 410, a code editor application 102, distributed ledger 412, and a blockchain module 414. The operating system 410 may include components that perform various additional functions generally associated with an operating system. For example, the operating system 410 may include components that enable the one or more computing nodes 400 to receive and transmit data via various interfaces (e.g., contributor controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). The operating system 410 may also provide an execution environment for the code editor application 102, the distributed ledger 412, and the blockchain module 414.

The code editor application 102 is configured to edit source code and provide features typical of an HTML, CSS, JavaScript, PHP editor, and/or so forth. For example, the code editor application 102 may provide syntax highlighting, find and replace, cut, copy, and paste, undo/redo, data transformation, language modes, auto-completion, code folding, bracket and tag matching, split views, inline and block widgets, bi-directional text support, extensibility, and/or so forth. These features may be switched on and off by a user command received via an application contributor interface, which may comprise a GUI that can include a dashboard and/or formatting tools for display. The code editor application 102 supports the various file format (e.g., plain text, XML files, NSIS files, batch files, C# files, Java files, etc.).

The code editor application 102 includes a parsing module 104 for parsing source code into one or more code segments representing a binary element based at least on one or more parsing parameters (e.g., programming language). The computing nodes 400 may have access to a database where parsing parameters can be stored. In various embodiments, the parsing module 104 may implement a machine learning algorithm to identify and parse one or more code segments of source code.

The code editor application 102 may include a flagging module 106 for identifying licenses associated with code segments and indicating license incompatibility based at least on the identified licenses. In some aspects, the flagging module 106 identifies a license associated with a code segment of source code using information from one or more blocks of a transaction, such as a hash value. For example, the flagging module 106 may compare the hash value of the code segment against known hash values. In response to making a determination that the hash value is equivalent to a known hash value, the flagging module 106 may indicate that the license associated with the code segment is equivalent or compatible to a license associated with the known hash value.

The code editor application 102 may include a recommendation module 108. The recommendation module 108 may generate a recommendation to resolve license incompatibility upon making a determination that a license under which a code segment of the source code is distributed is not compatible with an additional license under which an additional code segment of the source code is distributed. The recommendation module 108 may generate a recommendation based at least on the type of licenses and the reason for incompatibility. Additionally, the recommendation module 108 may generate a recommendation based at least on any errors present in the source code.

Additionally, the code editor application 102 may further comprise a component that supports digital signing, signature verification, and/or encryption. For instance, the code editor application 102 utilizes a digital certificate, which may be a hash function of a private key held by a contributor, while the contributor's public key, which may be distributed to one or more parties of the distributed ledger 412, may be used to authenticate that the contributor of the private key used in the hash function is indeed the contributor, thereby verifying the identity of the contributor. The hash function is applied to a parsed code segment of source code to generate a hash value. The code editor application 102 then applies a private key algorithm to the hash value to generate a signature.

The distributed ledger 412 is a tamper-proof shared digital ledger (e.g., a database) that records transactions or other types of data in a public or a private peer-to-peer network. The distributed ledger 412 may be distributed to all member nodes (e.g., the computing nodes 400) in the network to enable the member nodes to view transactions that are relevant to them, or in some embodiments, may view all the blocks of a distributed ledger. Each member node is its own authority, and anyone may participate in a transaction. In some embodiments, the right to participate in exchange information on a distributed ledger may be limited. The distributed ledger 412 may include one or more blocks, each associated with a respective transaction. The distributed ledger may receive a request, from the blockchain module 414 to add, delete, or update the one or more blocks.

The blockchain module 414 may be configured to maintain relationships and/or associations identifying how blocks may be related to one another, and/or the identity of various blocks (e.g., identifying what information is associated with each block). Further, the blockchain module 414 may maintain and update one or more distributed ledgers 412 (which may be stored locally or remotely, depending upon embodiments). For example, the blockchain module 414 may perform operations that update blocks, add blocks, delete blocks, validate new blocks, reject new blocks, and/or so forth.

Example Processes

Figure 5:
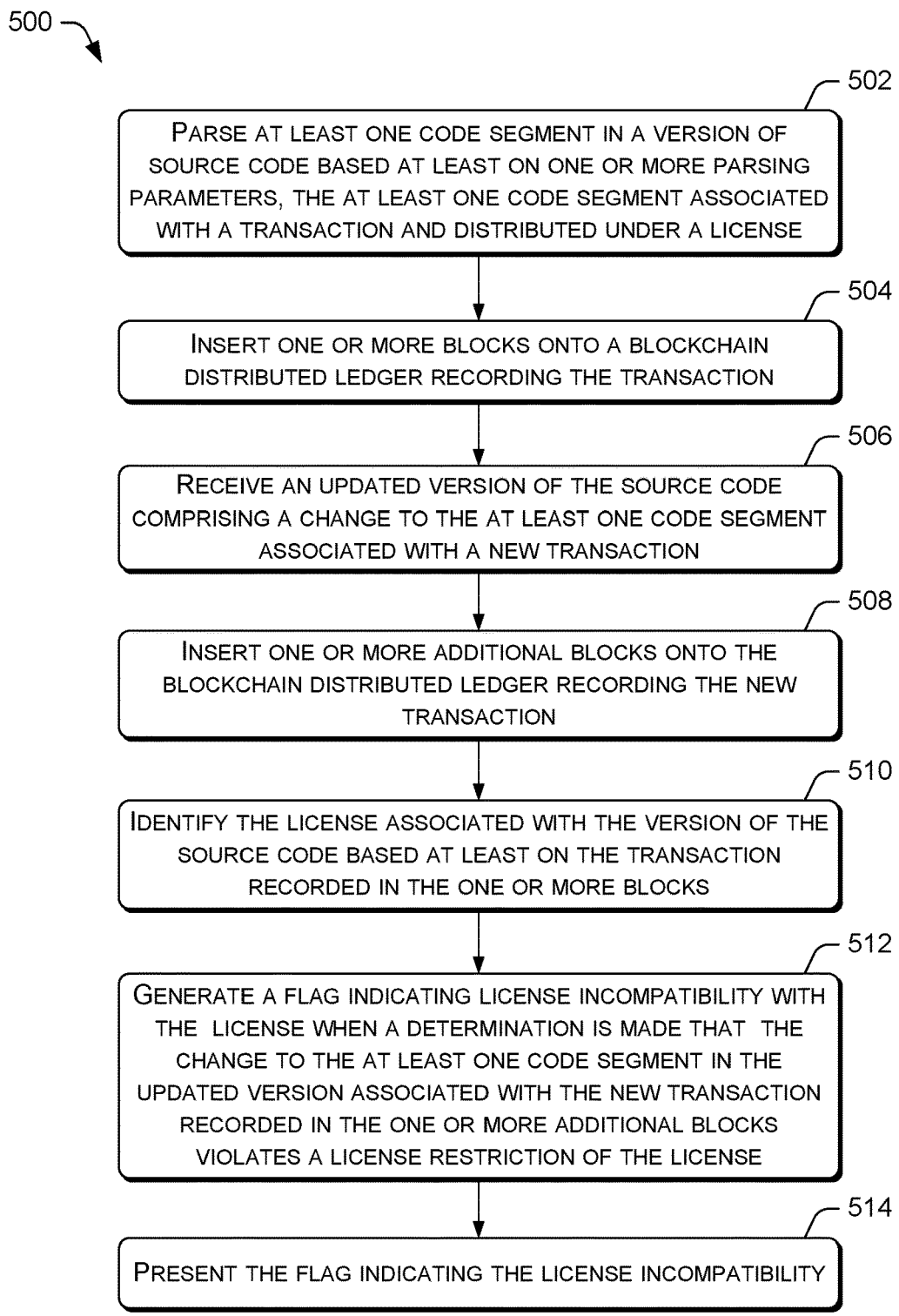
FIG. 5 is a flow diagram of an example process for implementing blockchain for managing license compatibility.
Figure 6:
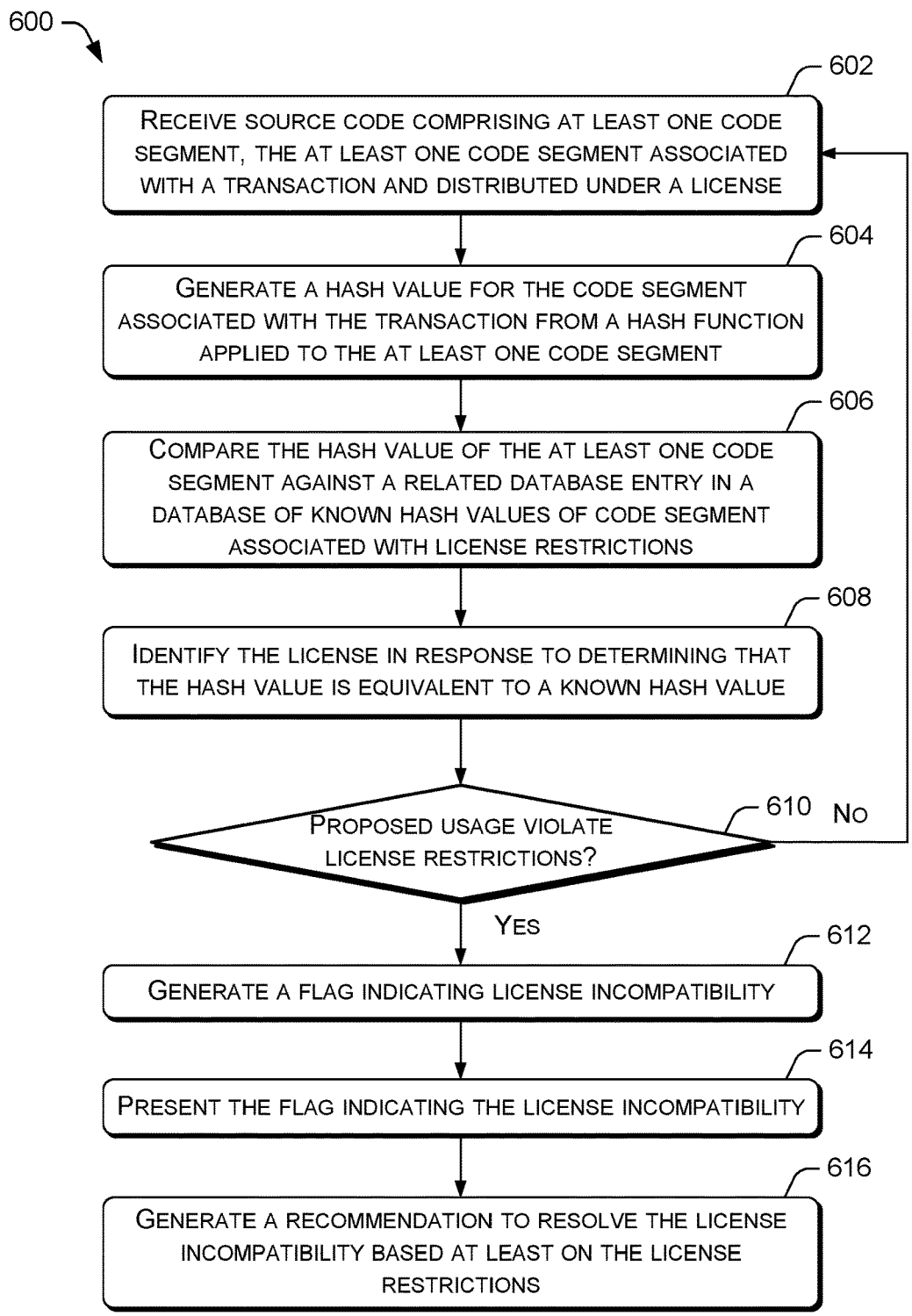
FIG. 6 is a flow diagram of an example process for flagging incompatible licenses.
Figure 7:
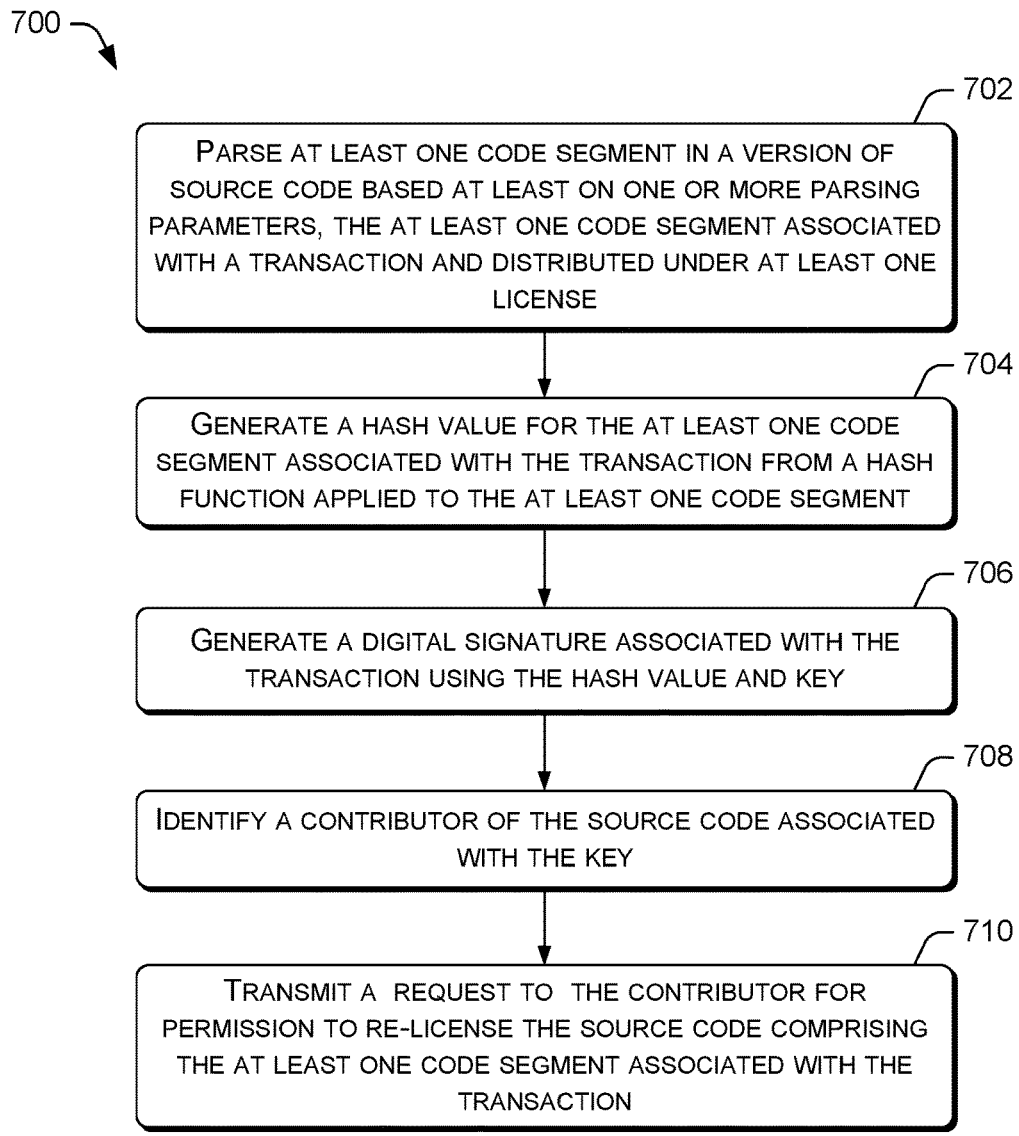
FIG. 7 is a flow diagram of an example process for re-licensing.

FIGS. 5 through 7 present illustrative processes 500 through 700 for implementing a blockchain to verify and track at least code segments of source code. Each of the processes 500 through 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 through 700 are generally described with reference to FIGS. 1 through 4.

FIG. 5 is a flow diagram of an example process 500 for implementing blockchain for managing license compatibility. At block 502, a computing node of a plurality of peer computing nodes that store at least a portion of a blockchain distributed ledger parses, via a parsing engine of a code editor application, at least one code segment in a version of source code based at least on one or more parsing parameters, the at least one code segment associated with a transaction and distributed under a license. The parsing parameters can depend on the client-side structured language, a programming language, a scripting language, contributors involved, operating system, and/or so forth. At block 504, the computing node inserts one or more blocks onto a blockchain distributed ledger recording the transaction. If the distributed ledger comprises a private channel and the blocks comprise private blocks, a private key may enable the computing node to view and add private blocks to the distributed ledger.

At block 506, the computing node receives an updated version of the source code comprising a change to the at least one code segment associated with a new transaction. The at least one parsed code segment in the updated version of the source code may be the same parsed code segment in the previous version of the source code. Additionally, or alternatively, the at least one parsed code segment in the updated version of the source code may be different from the parsed code segment in the previous version of the source code. At block 508, the computing node inserts one or more additional blocks onto the blockchain distributed ledger recording the new transaction.

At block 510, the computing node identifies the license associated with the version of the source code based at least on the transaction recorded in the one or more blocks. In one example, the computing node identifies the license based at least on a hash value associated with the at least one code segment. At block 512, the computing node generates a flag indicating license incompatibility with the license when a determination is made that the change to the at least one code segment in the updated version associated with the new transaction recorded in the one or more additional blocks violates a license restriction of the license. At block 514, the computing node presents the flag indicating the license incompatibility. Changes made to the version of the source code can be traced back to one or more transactions based on the information stored in the blocks, and thus to one or more contributors. In the illustrated embodiment, changes made to the at least one parsed code segment can be traced back to the new transaction recorded in the additional blocks.

FIG. 6 is a flow diagram of an example process 600 for identifying and flagging incompatible licenses. At block 602, a computing node receives source code comprising at least one code segment, the at least one code segment associated with a transaction and distributed under a license. At block 604, the computing node generates a hash value for the code segment associated with the transaction from a hash function applied to the at least one code segment. At block 606, the computing node compares the hash value of the at least one code segment against a related database entry in a database of known hash values of code segment associated with licenses and/or license restrictions. At block 608, the computing node identifies the license in response to determining that the hash value is equivalent to a known hash value. At decision block 610, the computing node determines whether the proposed usage of the code segment violates one or more license restrictions of the license. If the proposed usage of the code segment violates the one or more license restrictions ("yes" response from the decision block 610), the computing node generates a flag indicating license incompatibility, as indicated in block 612. At block 614, the computing node presents the flag indicating the license incompatibility. If the proposed usage does not violate license restrictions ("no" response from the decision block 610), the computing node may continue receiving source code from one or more peer computing nodes. At block 616, the computing node generates a recommendation to resolve the license incompatibility based at least on the license restrictions.

FIG. 7 is a flow diagram of an example process for re-licensing. At block 702, the computing node parses at least one code segment in a version of source code based at least on one or more parsing parameters, the at least one code segment associated with a transaction and distributed under at least one license. At block 704, the computing node generates a hash value for the at least one code segment associated with the transaction from a hash function applied to the at least one code segment. At block 706, the computing node generates a digital signature associated with the transaction using the hash value and key. At block 708, the computing node identifies a contributor to the source code associated with the key. At block 710, the computing node transmits a request to the contributor for permission to re-license the source code comprising the at least one segment associated with the transaction. Additionally, or alternatively, the computing node may transmit a request to the contributor for permission to purchase a license to utilize the code.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
receiving source code comprising at least one code segment, the at least one code segment associated with a transaction and distributed under a license;
generating a hash value for the code segment associated with the transaction from a hash function applied to the at least one code segment;
comparing the hash value of the at least one code segment against a related database entry in a database of known hash values of code segment associated with license restrictions;
identifying the license in response to determining that the hash value is equivalent to a known hash value;
determining that proposed usage of the at least one code segment violates restrictions of the license;
generating a flag indicating license incompatibility;
presenting the flag indicating the license incompatibility; and
generating a recommendation to resolve the license incompatibility based at least on the restrictions of the license.

2. The method of claim 1, comprising:
receiving additional source code comprising at least one additional code segment, the at least one additional code segment associated with an additional transaction and distributed under an additional license;
generating an additional hash value for the additional code segment associated with the additional transaction from an additional hash function applied to the at least one additional code segment;
comparing the additional hash value of the at least one additional code segment against an additional related database entry in the database of known hash values of code segment associated with license restrictions;
identifying the additional license in response to determining that the additional hash value is equivalent to an additional known hash value;
determining that proposed usage of the at least one additional code segment does not violate restrictions of the additional license; and
bypassing generating an additional recommendation based at least on the restrictions of the additional license.

3. The method of claim 1, comprising:
generating a digital signature associated with the code segment using the hash value and key;
identify a contributor of the source code associated with the key; and
transmit a request to the contributor for permission to license the source code comprising the at least one segment associated with the transaction.

4. The method of claim 1, wherein the at least one code segment comprises a module, a method, a library, or a function.

5. The method of claim 1, wherein the license comprises a free and open-source software license.

6. The method of claim 1, comprising:
identifying the at least one code segment by parsing the source code using a parsing parameter.

7. The method of claim 6, wherein the parsing parameter are based at least on a client-side structured language, a programming language, or a scripting language.

8. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to perform acts comprising:
receiving source code comprising at least one code segment, the at least one code segment associated with a transaction and distributed under a license;
generating a hash value for the code segment associated with the transaction from a hash function applied to the at least one code segment;
comparing the hash value of the at least one code segment against a related database entry in a database of known hash values of code segment associated with license restrictions;
identifying the license in response to determining that the hash value is equivalent to a known hash value;
determining that proposed usage of the at least one code segment violates restrictions of the license;
generating a flag indicating license incompatibility;
presenting the flag indicating the license incompatibility; and
generating a recommendation to resolve the license incompatibility based at least on the restrictions of the license.

9. The system of claim 8, wherein the acts comprise:
receiving additional source code comprising at least one additional code segment, the at least one additional code segment associated with an additional transaction and distributed under an additional license;
generating an additional hash value for the additional code segment associated with the additional transaction from an additional hash function applied to the at least one additional code segment;
comparing the additional hash value of the at least one additional code segment against an additional related database entry in the database of known hash values of code segment associated with license restrictions;
identifying the additional license in response to determining that the additional hash value is equivalent to an additional known hash value;
determining that proposed usage of the at least one additional code segment does not violate restrictions of the additional license; and
bypassing generating an additional recommendation based at least on the restrictions of the additional license.

10. The system of claim 8, wherein the acts comprise:
generating a digital signature associated with the code segment using the hash value and key;
identify a contributor of the source code associated with the key; and
transmit a request to the contributor for permission to license the source code comprising the at least one segment associated with the transaction.

11. The system of claim 8, wherein the at least one code segment comprises a module, a method, a library, or a function.

12. The system of claim 8, wherein the license comprises a free and open-source software license.

13. The system of claim 8, wherein the acts comprise:
identifying the at least one code segment by parsing the source code using a parsing parameter.

14. The system of claim 13, wherein the parsing parameter is based at least on a client-side structured language, a programming language, or a scripting language.

15. One or more non-transitory computer-readable media storing computer-executable instructions that upon execution cause one or more processors to perform acts comprising:
receiving source code comprising at least one code segment, the at least one code segment associated with a transaction and distributed under a license;
generating a hash value for the code segment associated with the transaction from a hash function applied to the at least one code segment;
comparing the hash value of the at least one code segment against a related database entry in a database of known hash values of code segment associated with license restrictions;
identifying the license in response to determining that the hash value is equivalent to a known hash value;
determining that proposed usage of the at least one code segment violates restrictions of the license;
generating a flag indicating license incompatibility;
presenting the flag indicating the license incompatibility; and
generating a recommendation to resolve the license incompatibility based at least on the restrictions of the license.

16. The media of claim 15, wherein the acts comprise:
receiving additional source code comprising at least one additional code segment, the at least one additional code segment associated with an additional transaction and distributed under an additional license;
generating an additional hash value for the additional code segment associated with the additional transaction from an additional hash function applied to the at least one additional code segment;
comparing the additional hash value of the at least one additional code segment against an additional related database entry in the database of known hash values of code segment associated with license restrictions;
identifying the additional license in response to determining that the additional hash value is equivalent to an additional known hash value;
determining that proposed usage of the at least one additional code segment does not violate restrictions of the additional license; and
bypassing generating an additional recommendation based at least on the restrictions of the additional license.

17. The media of claim 15, wherein the acts comprise:
generating a digital signature associated with the code segment using the hash value and key;
identify a contributor of the source code associated with the key; and
transmit a request to the contributor for permission to license the source code comprising the at least one segment associated with the transaction.

18. The media of claim 15, wherein the at least one code segment comprises a module, a method, a library, or a function.

19. The media of claim 15, wherein the license comprises a free and open-source software license.

20. The media of claim 15, wherein the acts comprise:
identifying the at least one code segment by parsing the source code using a parsing parameter.

* * * * *